Jan. 24, 1961   B. JOHNSON   2,968,901
CARTONER
Filed Nov. 16, 1959   14 Sheets-Sheet 1
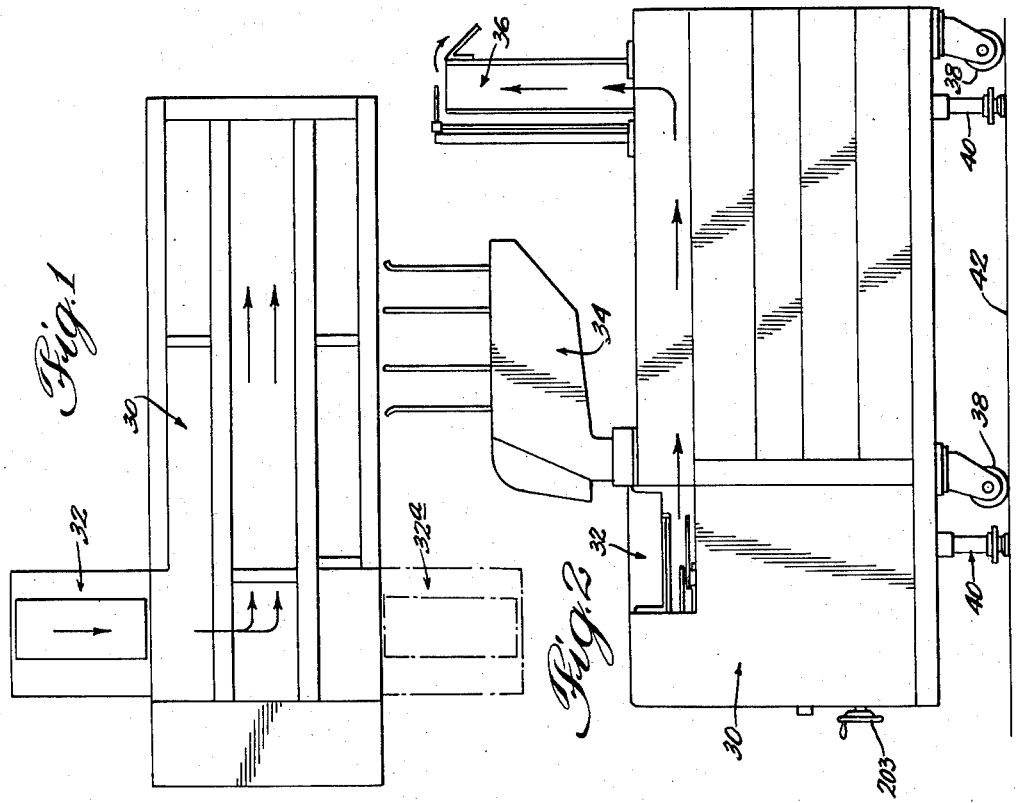
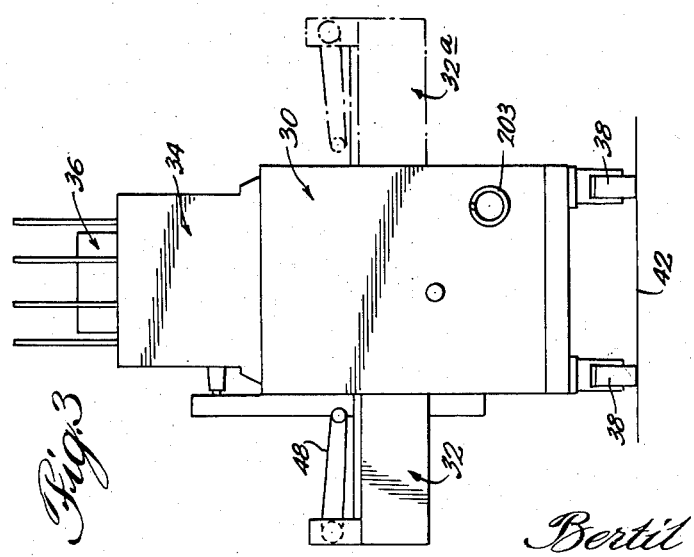
INVENTOR:
Bertil Johnson,
BY Bair, Freeman & Molinare
ATTORNEYS.

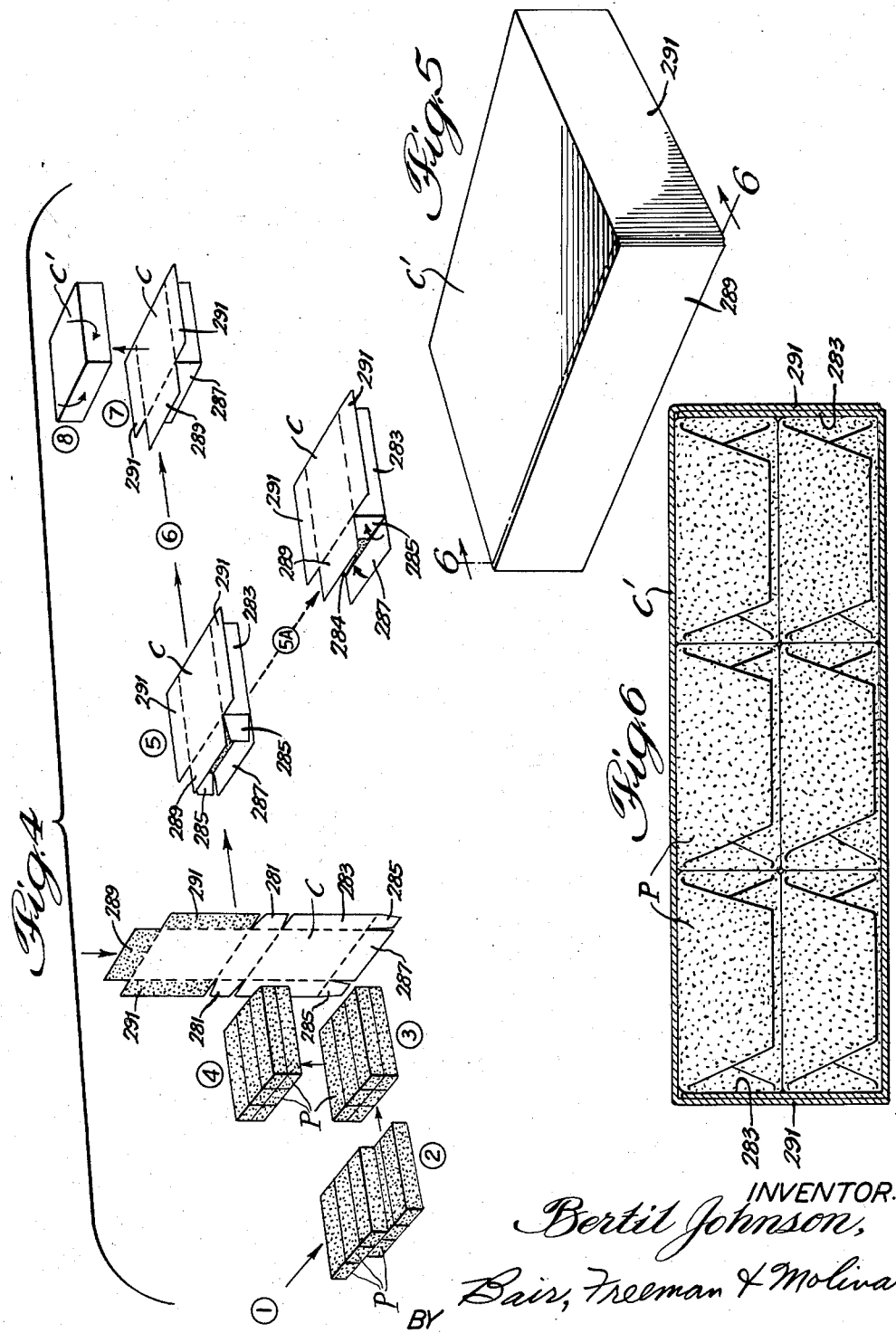

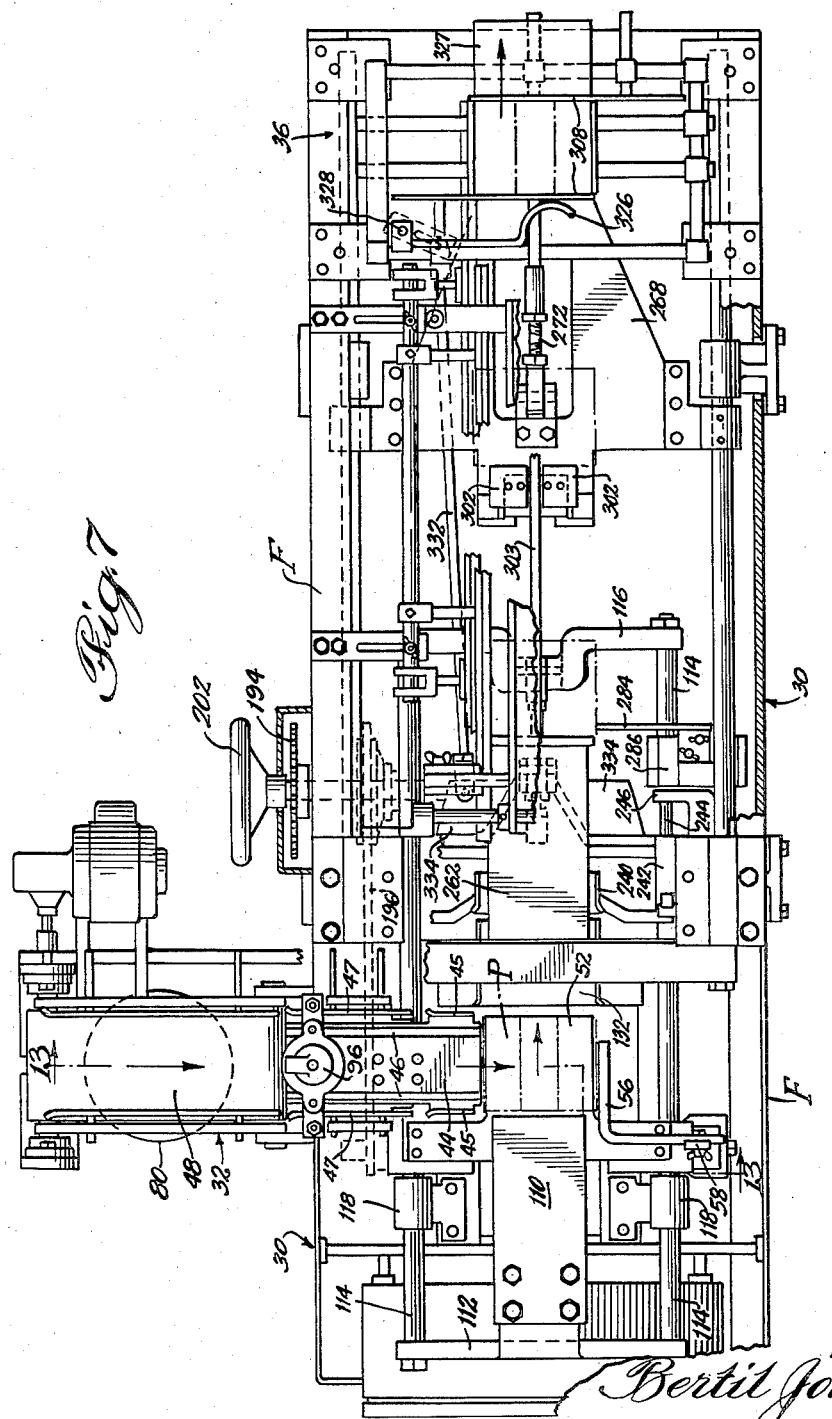

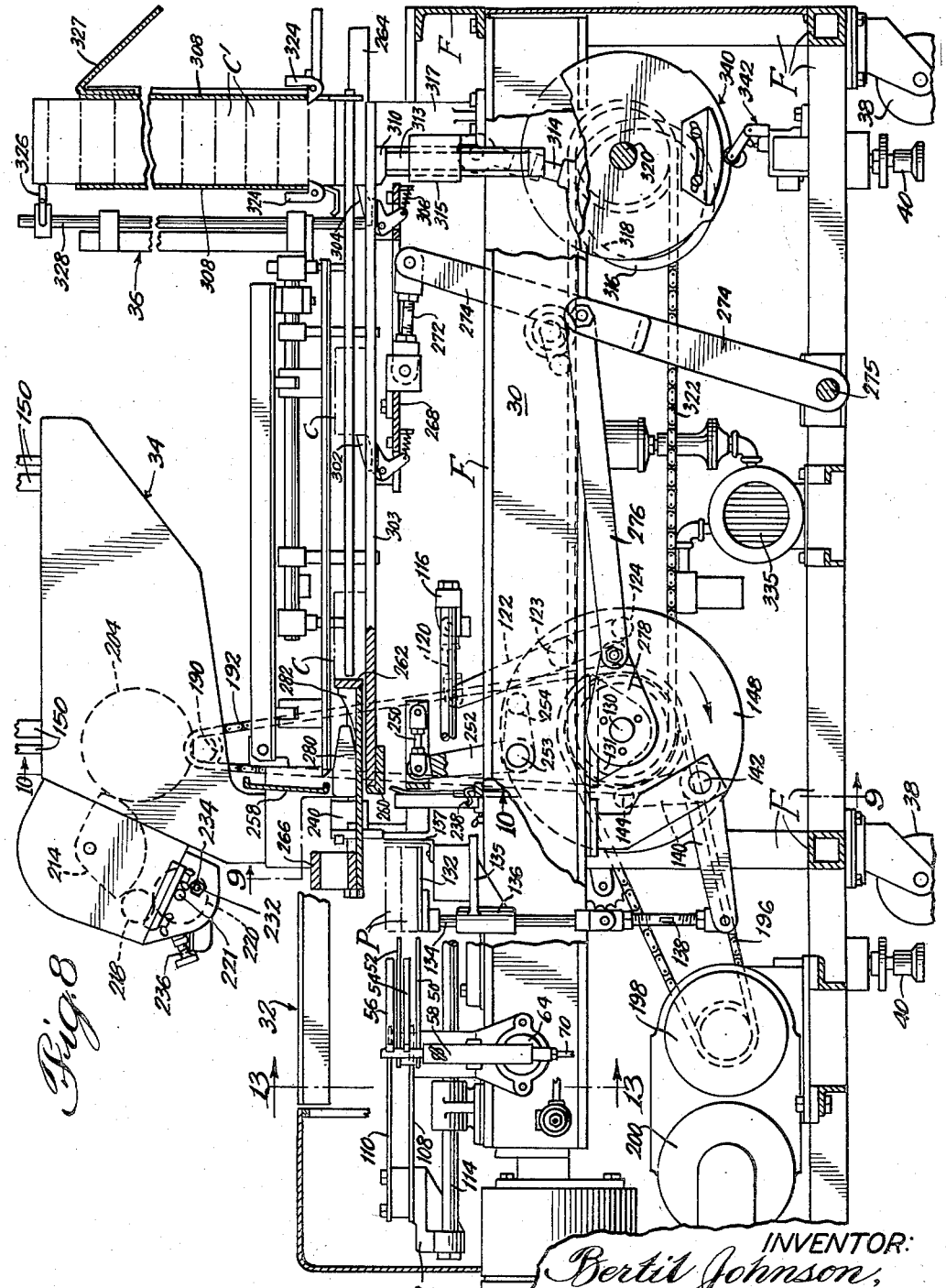

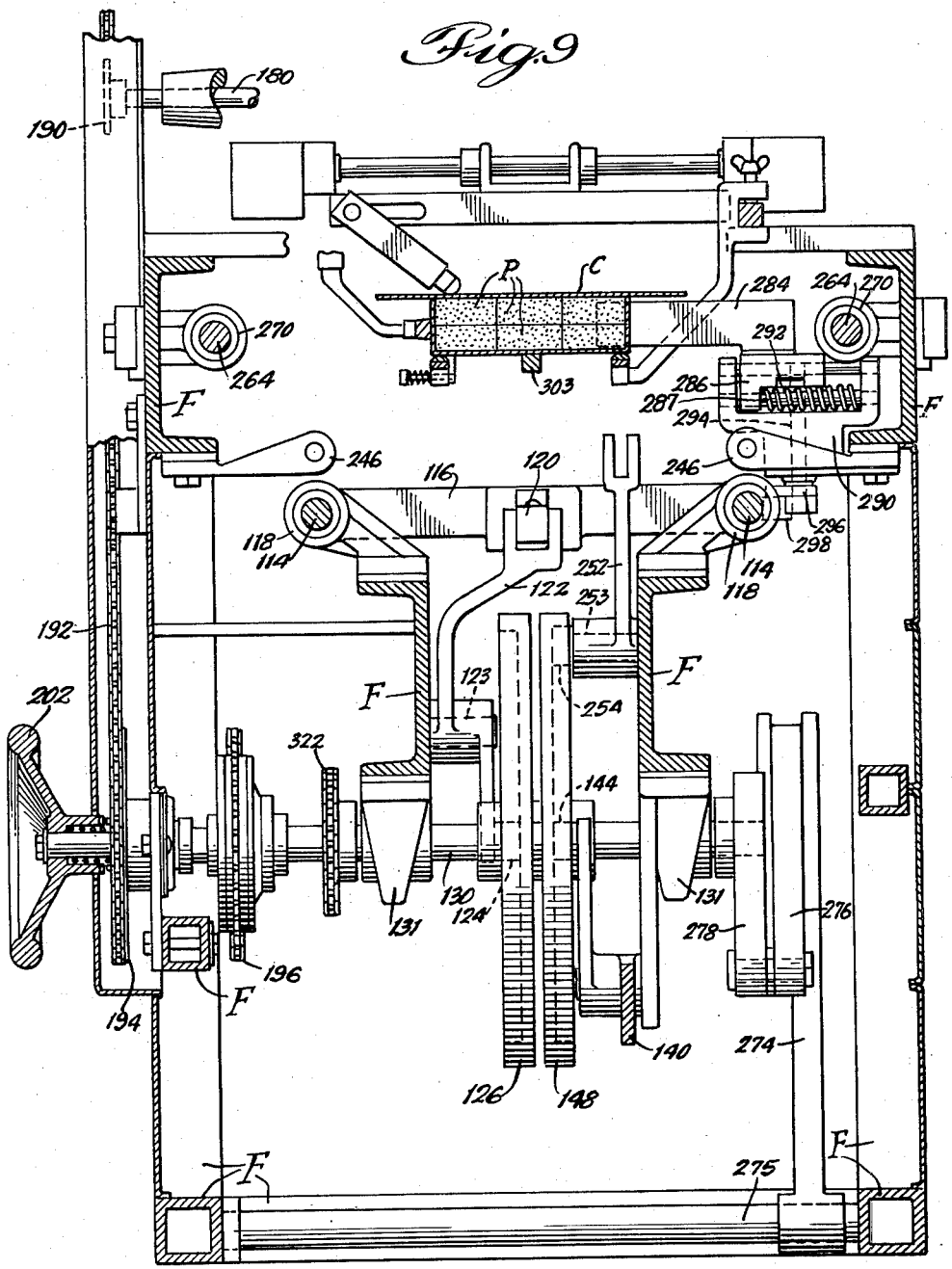

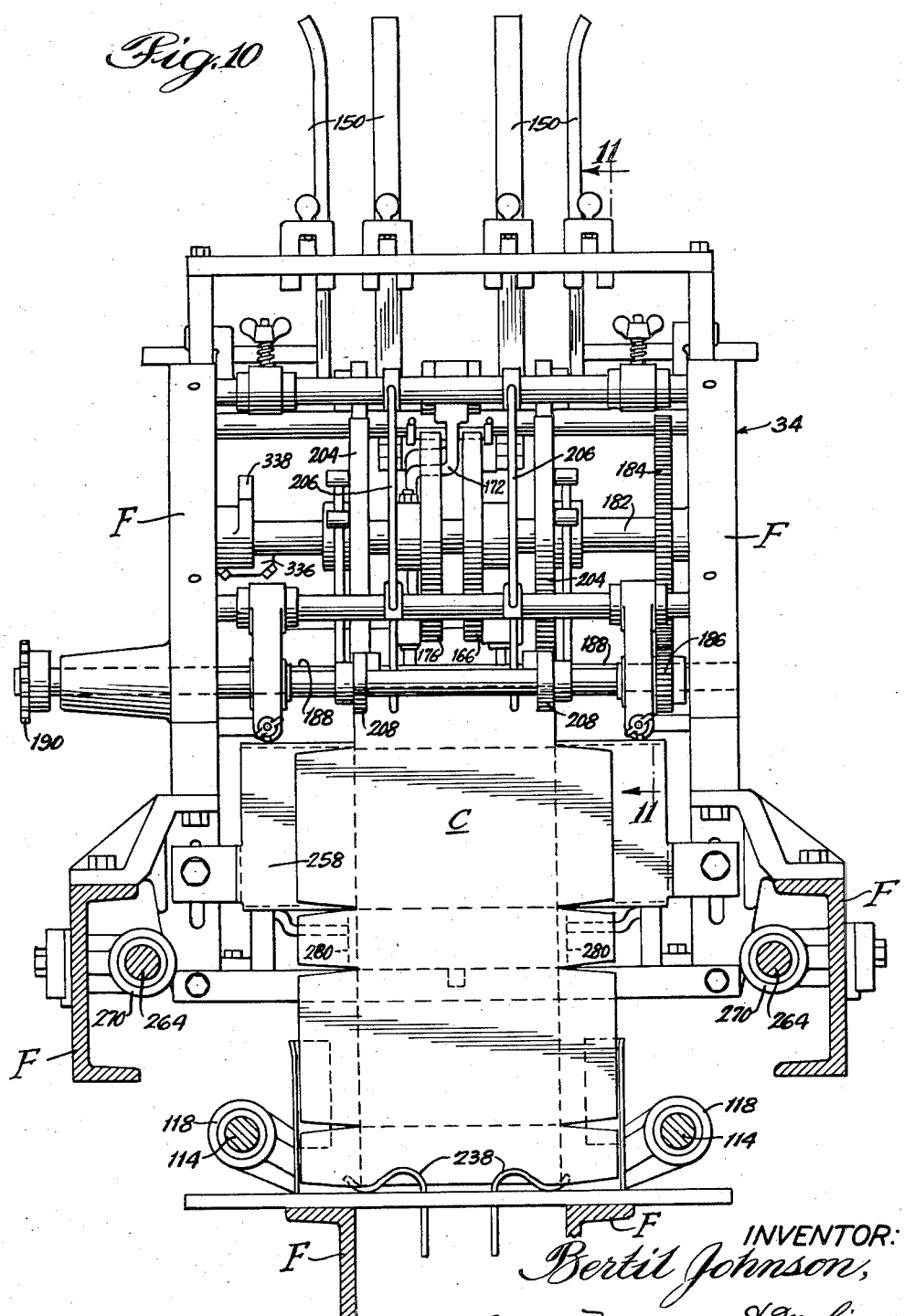

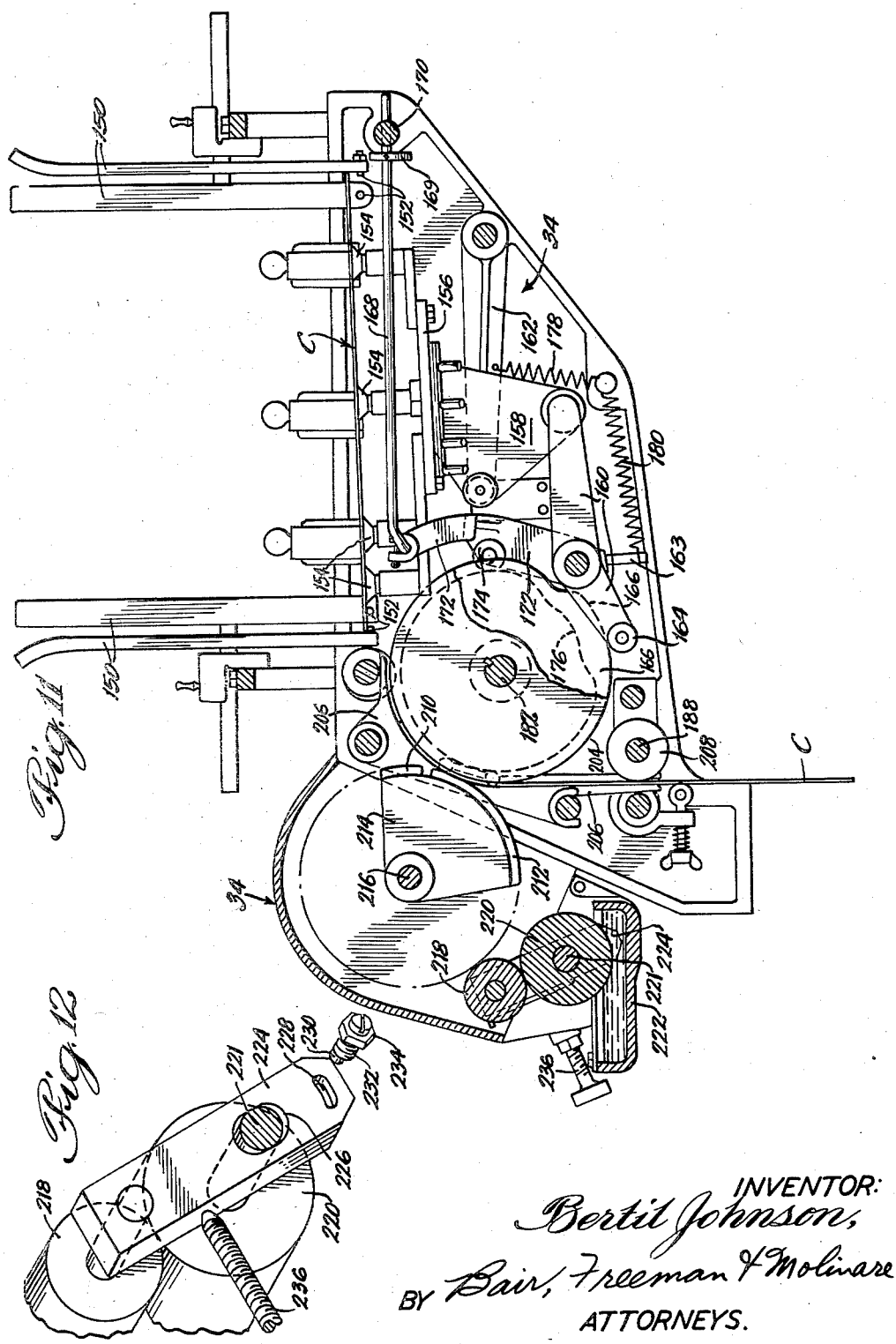

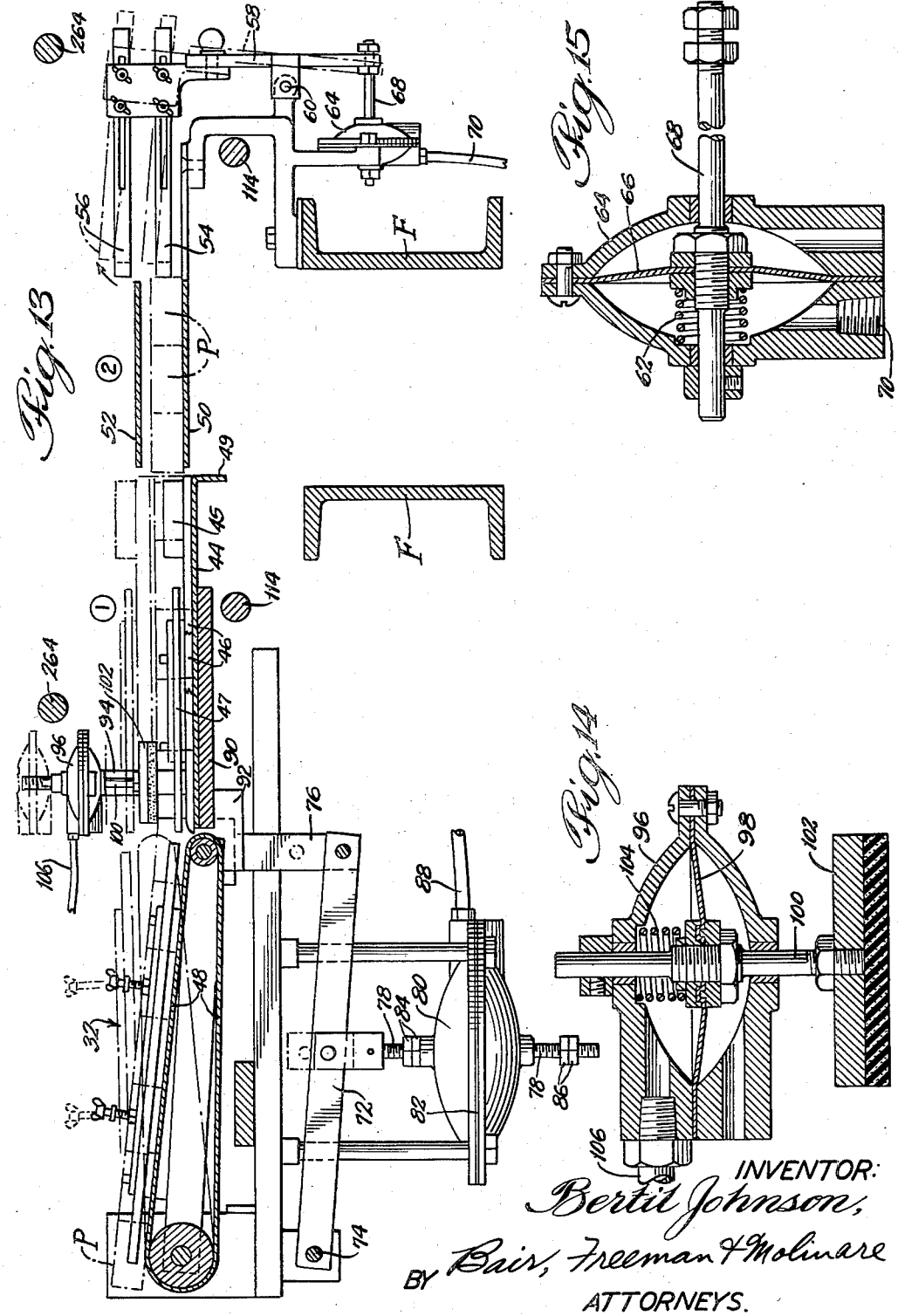

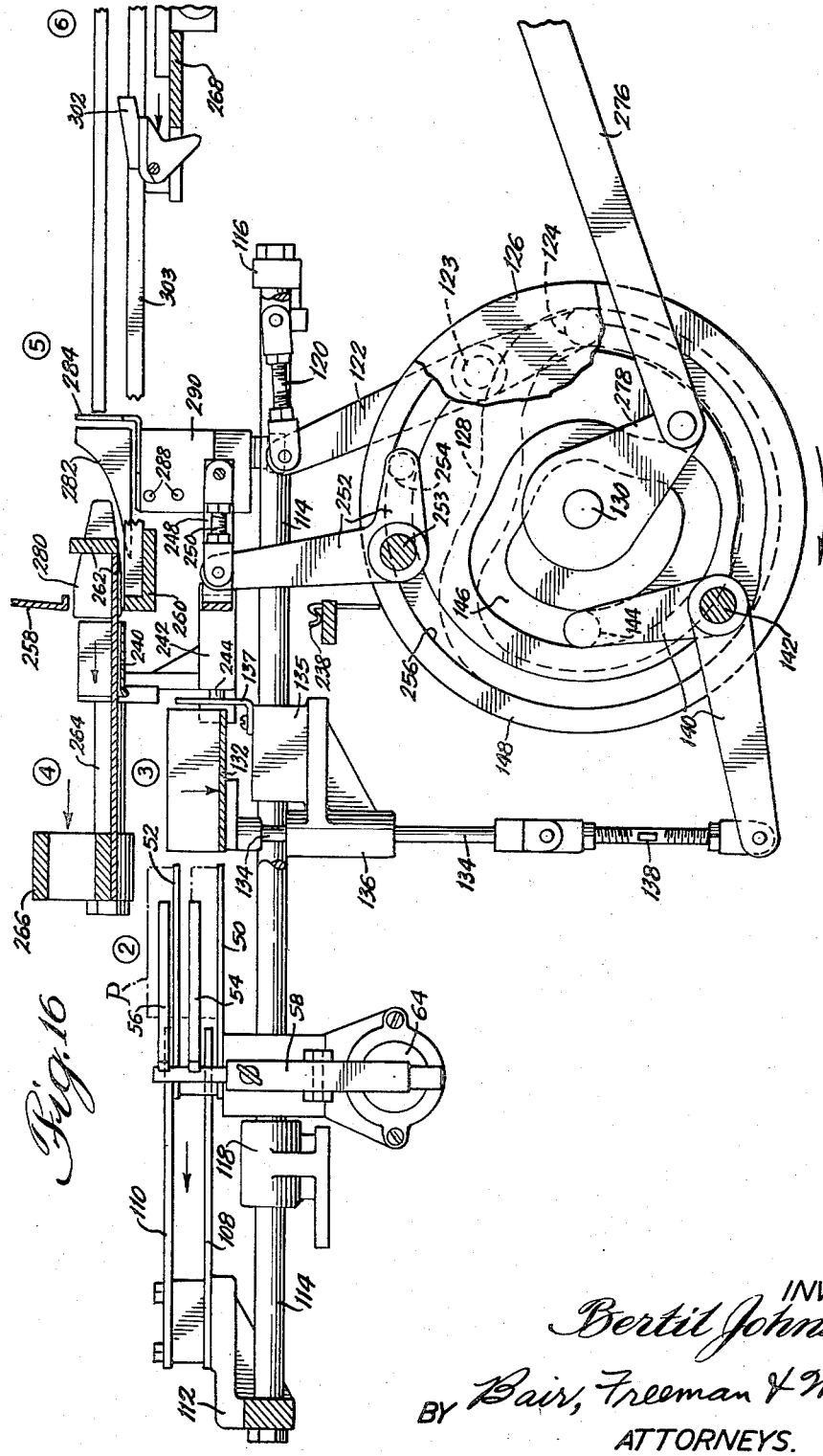

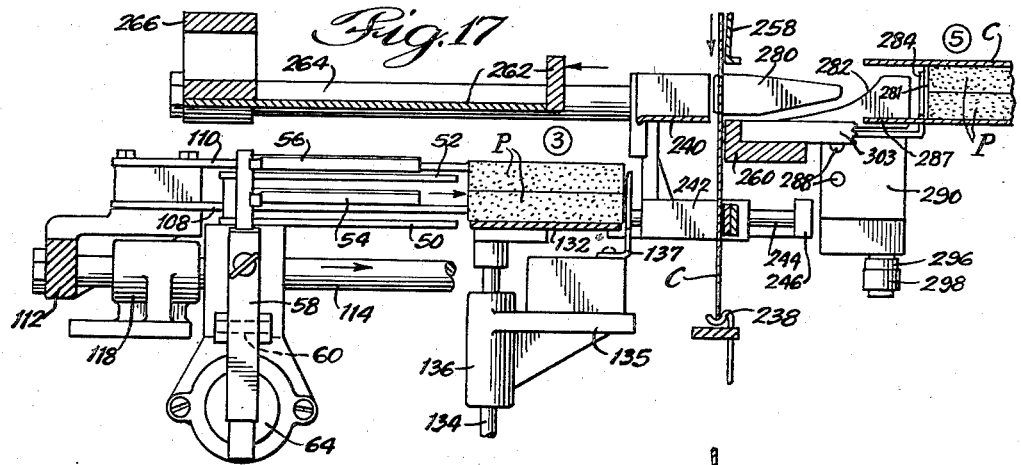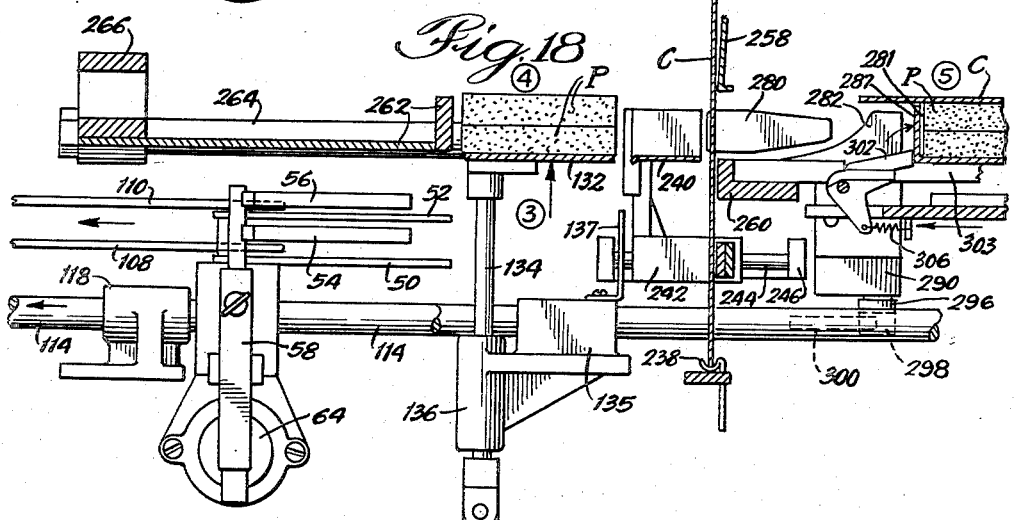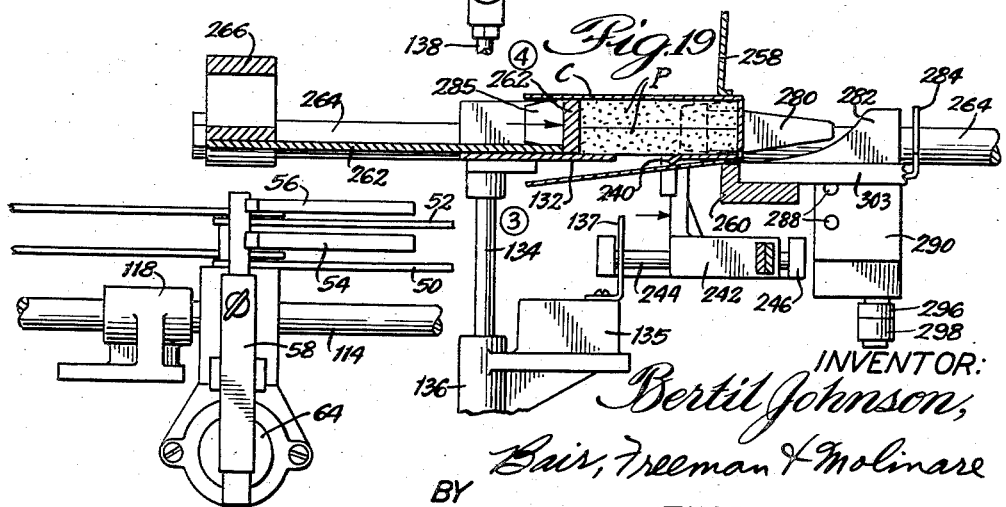

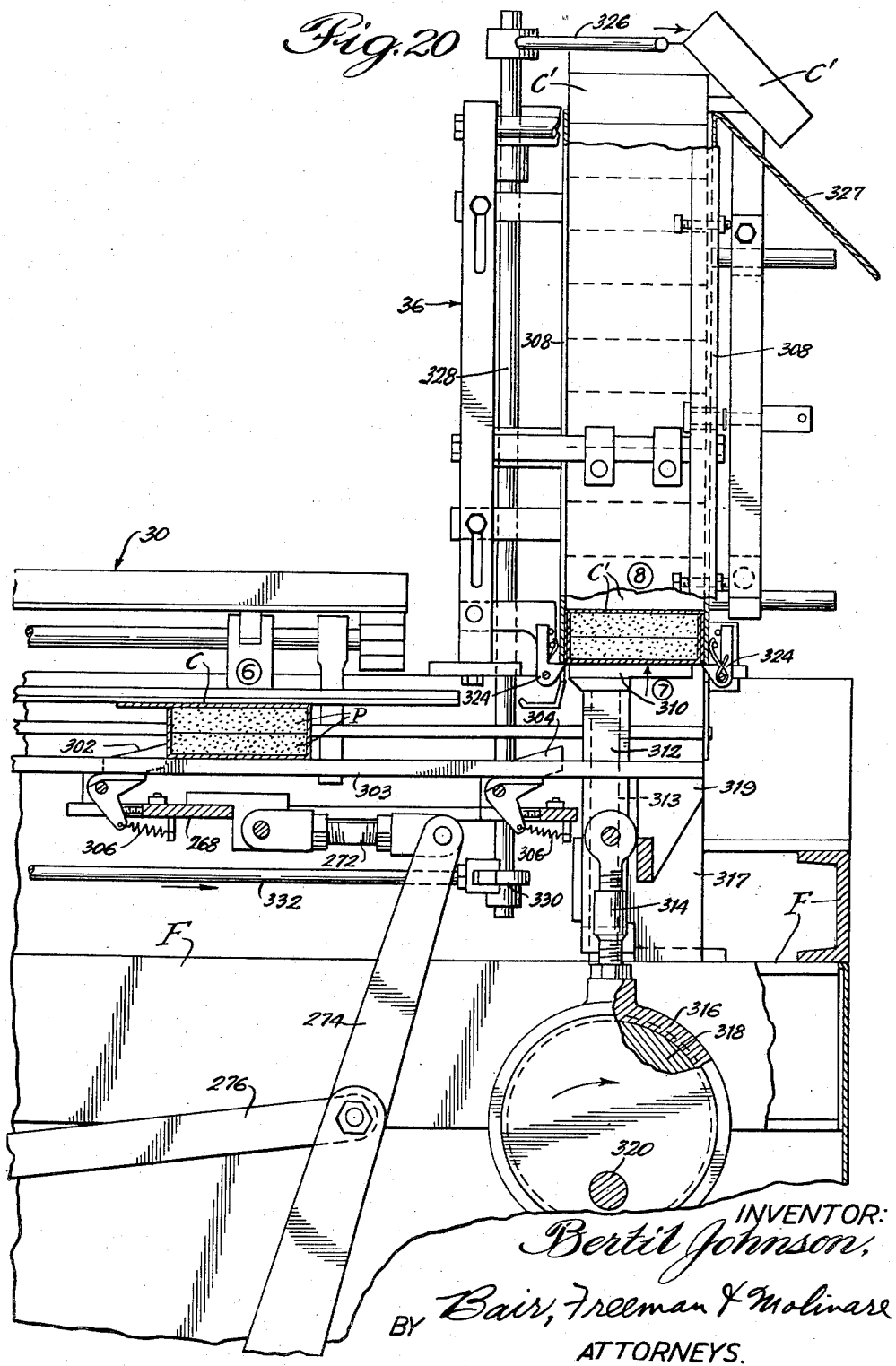

Jan. 24, 1961
B. JOHNSON
2,968,901
CARTONER
Filed Nov. 16, 1959
14 Sheets-Sheet 12
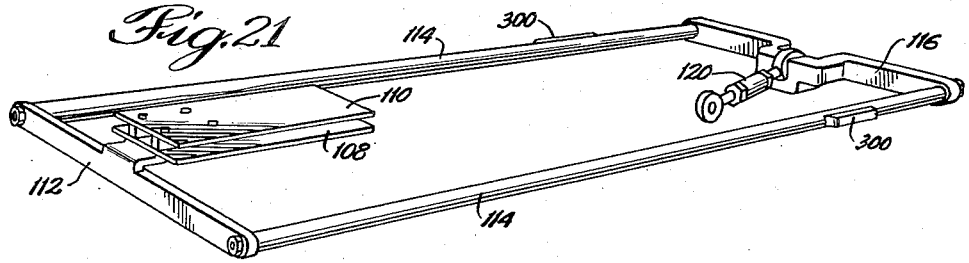
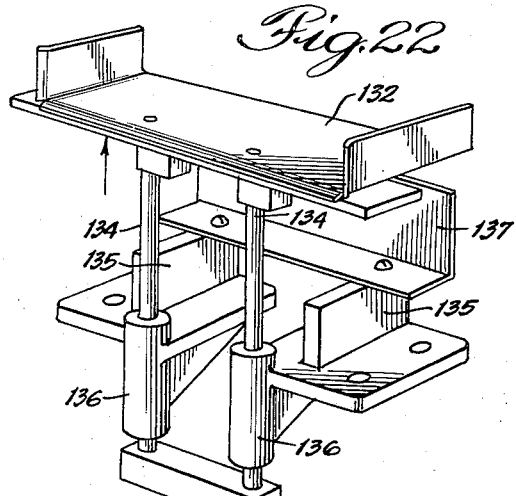
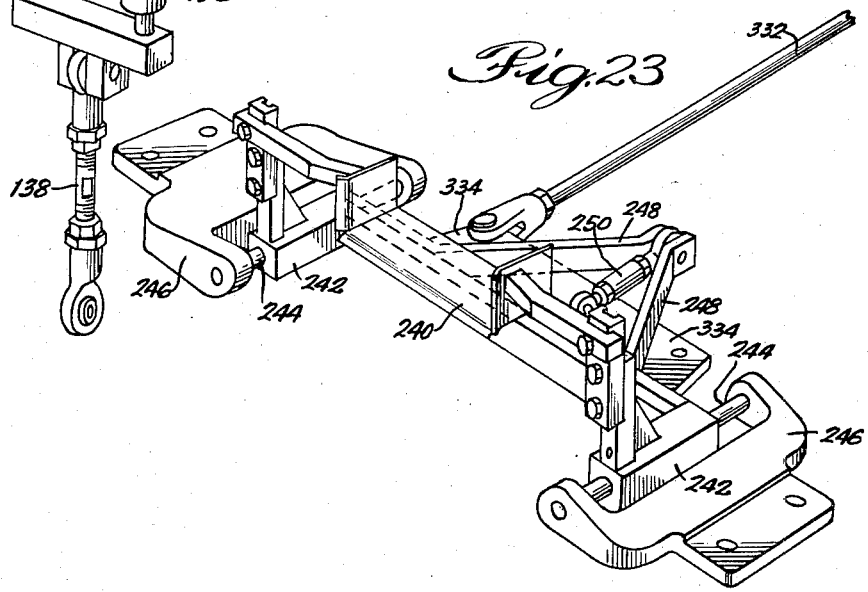
INVENTOR:
Bertil Johnson,
BY Bair, Freeman & Molinare
ATTORNEYS.

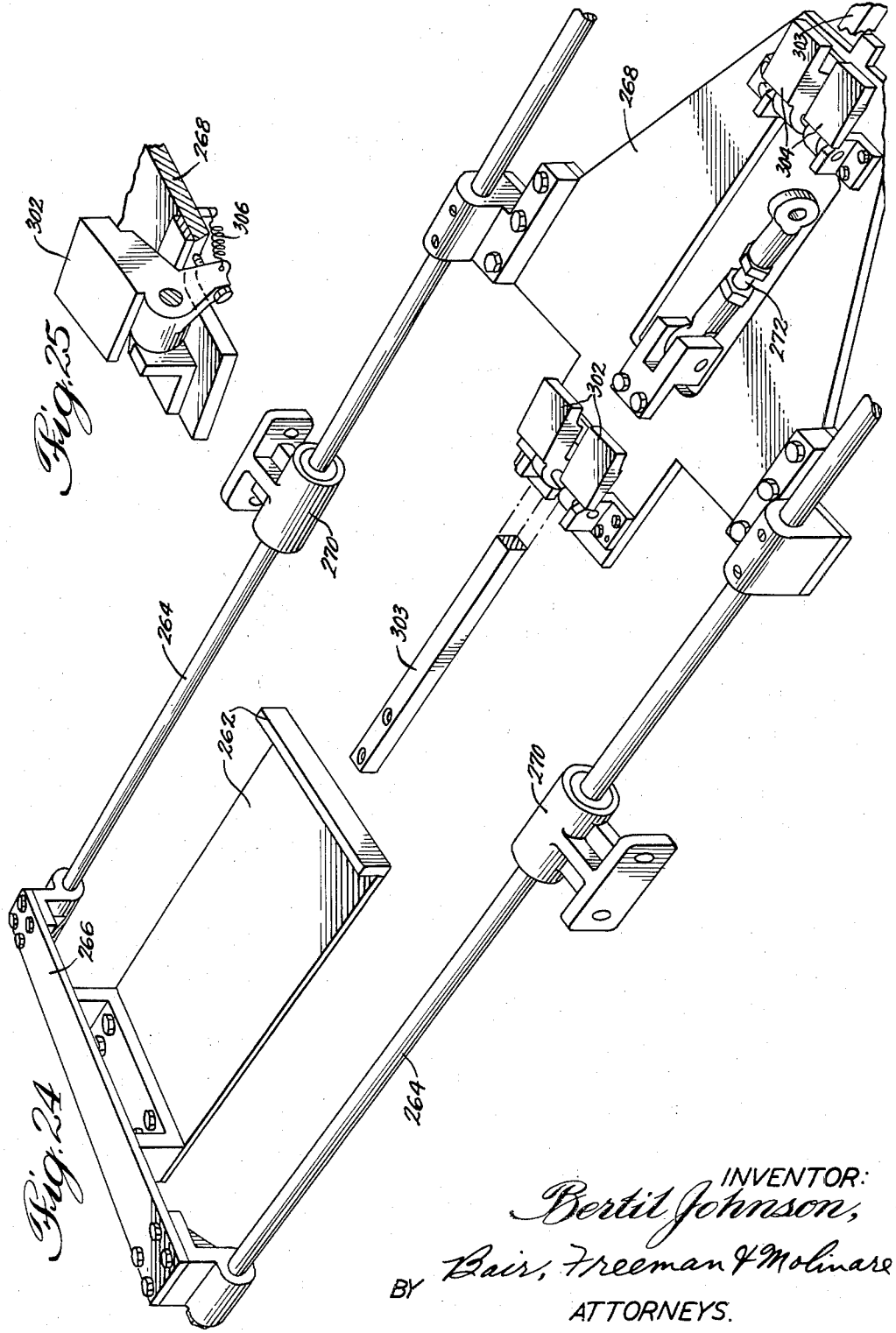

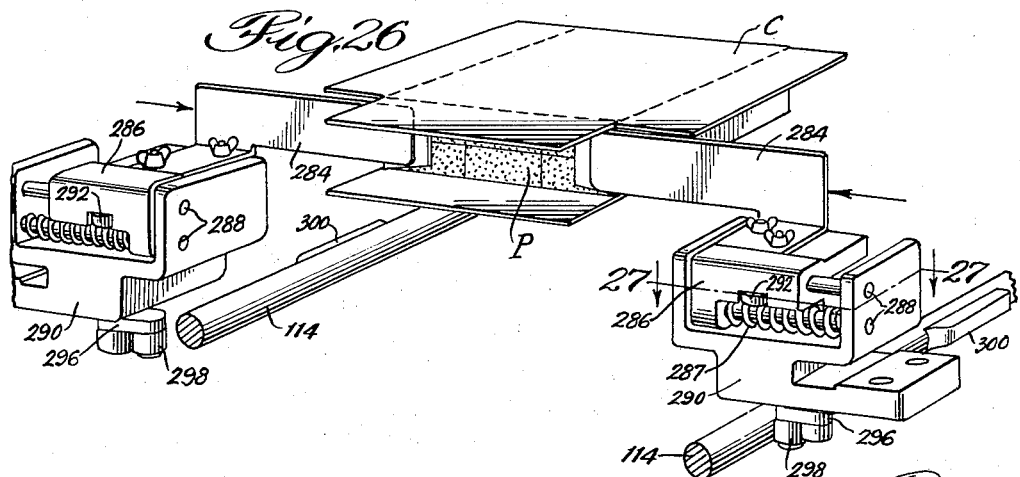
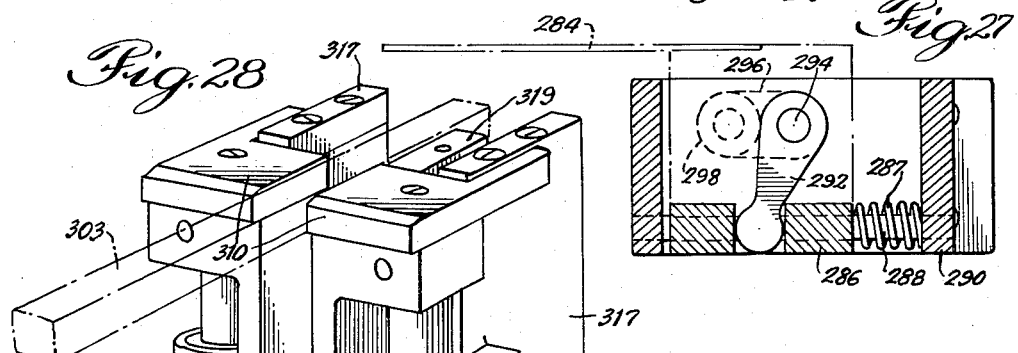
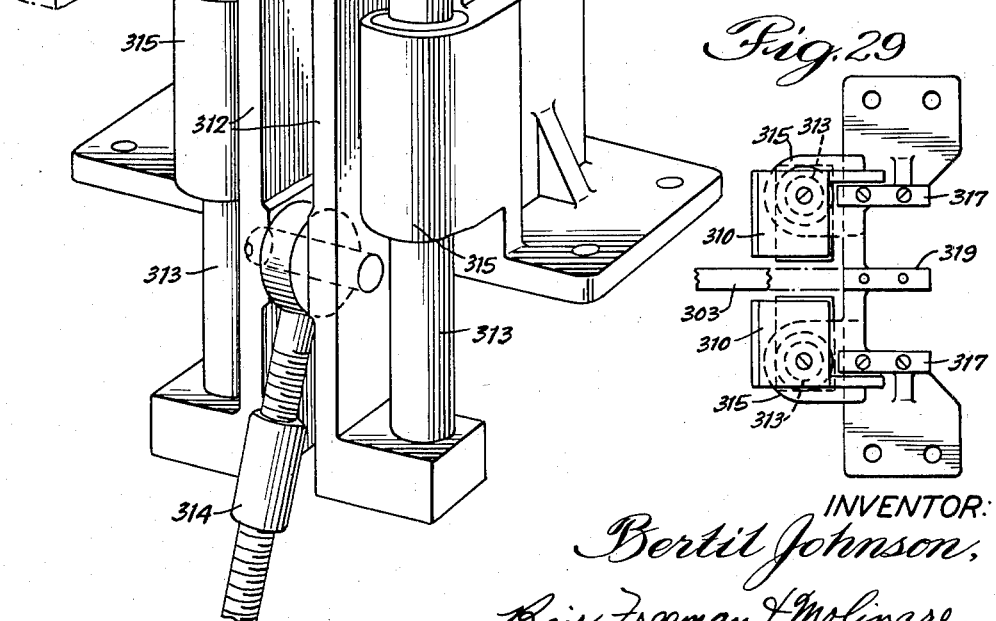

United States Patent Office 2,968,901
Patented Jan. 24, 1961

2,968,901

CARTONER

Bertil Johnson, Anderson, Ind., assignor to Lynch Corporation, Anderson, Ind., a corporation of Indiana Filed Nov. 16, 1959, Ser. No. 853,129

24 Claims. (Cl. 53—230)

This invention relates to a cartoning machine for automatically cartoning product, such as candy bars and the like.

One object of the invention is to provide a cartoner having mechanism which removes cartons in the flat from a stack thereof and delivers them to a cartoning position, collects a desired number of the product, moves the product against the carton and folds the carton around the collected product, gluing it in closed condition and discharging it from the machine.

Another object is to provide an in-feed conveyor arrangement that feeds a desired quantity of the product and one or two layers thereof as desired onto collector plates from which the product is moved to cartoning position.

Still another object is to provide a simple cartoning operation in which the collected product is moved against the carton, and then between carton breakers and tucker arrangements that partially enfold the carton about the collected product and delivers the assembly of product and carton to a position station in the machine over an elevator.

A further object is to provide an elevator at the station referred to for elevating the partially cartoned product through a compression chamber that folds glued flaps of the carton in closed position and applies pressure several cycles of operation of the cartoning machine to insure setting of the glue.

Still a further object is to provide novel product collector means as well as tab and flap tuckers, together with suitable actuating mechanism therefor, and pusher dog and elevator assemblies together with actuating mechanism for them to accomplish the various cartoning operations in an automatic and efficient manner, thus permitting a relatively high cartoning rate.

With these and other objects in view, my invention consists in the construction, arrangement and combination of the various parts of my cartoning machine, whereby the objects above contemplated are attained, as hereinafter more fully set forth, pointed out in my claims and illustrated in detail on the accompanying drawings, wherein:

Fig. 1 is a diagrammatic plan view of a cartoner embodying my present invention;

Fig. 2 is a side elevation thereof;

Fig. 3 is an end elevation thereof looking at the left-hand end of Fig. 2;

Fig. 4 is a perspective view of product to be cartoned and cartons, in various stages of completion as the cartoning operation is performed in my cartoner.

Fig. 5 is a perspective view of the completed carton;

Fig. 6 is a sectional view thereof on the line 6—6 of Fig. 5 showing the product within the carton;

Fig. 7 is a detailed plan view of my cartoner on an enlarged scale with respect to Fig. 1;

Fig. 8 is a detailed side elevation thereof with portions broken away and other portions shown in section;

Fig. 9 is a further enlarged vertical sectional view on the line 9—9 of Fig. 8;

Fig. 10 is a similar sectional view on the line 10—10 of Fig. 8 and is an overlapping extension of the upper end of Fig. 9, and shows a carton feeding mechanism;

Fig. 11 is a vertical sectional view on the line 11—11 of Fig. 10 showing particularly a gluing and vacuum carton feed mechanism;

Fig. 12 is an enlarged perspective detail of a portion of Fig. 11;

Fig. 13 is a vertical sectional view on the line 13—13 of Fig. 8 illustrating a product feeding and stacking mechanism;

Fig. 14 is an enlarged vertical sectional view of a product clamping mechanism shown at the top of Fig. 13;

Fig. 15 is an enlarged vertical sectional view through a stop operating mechanism shown at the lower right-hand corner of Fig. 13;

Fig. 16 is an enlargement of certain portions of the central part of Fig. 8 to show further details of construction and to illustrate a portion of the operating cycle of my cartoner;

Figs. 17, 18 and 19 are similar to portions of Fig. 16 showing further steps in the operating cycle;

Fig. 20 is a further enlargement of the right-hand end of Fig. 8 showing further steps in the operating cycle;

Fig. 21 is a detailed perspective view of a collector pusher and a slide on which it is mounted;

Fig. 22 is a detailed perspective view of a collector elevator, the mounting therefor, and a product stop;

Fig. 23 is a perspective view of a pre-break horn and the operating mechanism therefor;

Fig. 24 is a perspective view of a main slide, and a cartoning pusher and pusher dogs carried thereby;

Fig. 25 is a perspective view on an enlarged scale showing one of the pusher dogs per se;

Fig. 26 is a perspective view of a pair of tab folders and the operating mechanism therefor;

Fig. 27 is a sectional view on the line 27—27 of Fig. 26;

Fig. 28 is a perspective view of a cartoned product elevator and the mounting means therefor; and Fig. 29 is a plan view of Fig. 28.

On the accompanying drawings, and first referring to Fig. 1, I have used the reference numeral 30 to indicate the main body of my cartoner. The cartoner has an in-feed section 32 which, as shown by dotted lines, has an alternate position 32a in Figs. 1 and 3 so that the machine can be made left side or right side feed as desired, depending on the space available. A carton feeder and glue-applying section 34 is shown (omitted from Fig. 1) and a carton compression section 36 (also omitted from Fig. 1). The machine is mounted on casters 38 for portability, and provided with leveling screws 40 that support the machine when in the desired position on a floor 42.

My cartoner has a frame consisting of several square tubular members and channel members suitably secured together as by welding, and identified on the drawing in general by the reference character F, but I will not go into details as to the construction of the frame as it is believed obvious. The various mechanisms of my cartoner are mounted on the frame F, as will be evident from the following description.

First, however, I wish to refer to Fig. 4 wherein I have indicated stations (1) to (8) inclusive. Product such as ice cream bars, candy bars, and the like, are indicated at P, six of the bars being assembled at station (2) whereafter they are pushed to station (3), then elevated to station (4) and then moved to station (5). During such movement the bars P engage a carton blank C. At station (5) the bars are partially enclosed in the carton blank C, further enclosed at station (5) as shown at (5A), idle at station (6) where showing of the product and carton have been omitted, and still further enclosed at station (7). The assembly of carton and bars is then elevated to station (8) which effects completion of the enclosure of the assembled bars in the carton, and the completed carton at station (8) is indicated C'. Fig. 5 shows an enlargement of the completed carton C' and Fig. 6 a sectional view thereof with the bars P therein.

The in-feed section 32 shown generally in Fig. 3 is shown more in detail in Figs. 13, 14, 15 and 16. It comprises a product dead plate 44 having a pair of spaced rails 46 thereon along which the bars P are slid from an in-feed conveyor belt 48 that travels faster than the cartoner receives product and therefore slips under the bars at certain times. The bars are slid along the rails 46 and onto a stationary bottom plate 50 secured to the frame F. The foremost bar on the plate 50 is stopped by a lower stop 54 as shown in Fig. 13 and there are also a stationary top plate 52 above the plate 50 and an upper stop 56 above the stop 54. The two stops 54 and 56 are carried by a rock lever 58 pivoted at 60. The rock lever 58 is normally biased to the solid line position shown in Fig. 13 by a spring 62 shown in Fig. 15 in a diaphragm housing 64 having therein a diaphragm 66. The diaphragm 66 is operatively connected by a stem 68 to the lower end of the rock lever 58 and the diaphragm is vacuum operated through a vacuum connection 70, as will hereinafter appear. The assembly of parts 54 to 68 inclusive may be considered a "stop unit."

The in-feed conveyor 48 is movable between the solid line position shown in Fig. 13 and the dotted line position indicated therein by being pivoted at its left-hand end and vertically movable at its right-hand end. To accomplish such movement, a lever 72 is pivoted at 74 and connected by a link 76 to the right-hand end of the conveyor. A stem 78 is operatively connected to the lever and secured to a diaphragm 82 (in a manner similar to that shown in Fig. 15) located within a diaphragm housing 80. Upper and lower motion limiting stop nuts 84 and 86 are provided on the stem 78, and a vacuum connection is shown at 88, the normal tendency of the diaphragm 82 being biased downwardly by the weight of the conveyor 48 and all parts supported by the lever 72 so that the application of vacuum to the top of the diaphragm 82 lifts the conveyor 48. The elements 72 to 86 may be termed a "lift unit."

The dead plate 44 and the rails 46 thereon are also lifted by this unit, the plate 44 being mounted on a somewhat heavier plate 90 which is connected by a bracket 92 to the link 76. The dead plate 44 is also provided with guide plates 45 and with guide rails 47. After eight bars P are fed onto the rails 46, three of them will have been deposited on the plate 50 as shown in Fig. 13, and five will remain on the dead plate, whereupon the lift unit 72—86 operates to elevate the conveyor 48 and the dead plate 44 to the dotted line position, and bars are then fed by the conveyor to push three of the five bars off the dead plate and onto the top plate 52 as three more bars from the conveyor belt are fed onto the rails 46, whereupon the vacuum is cut off from the vacuum connection 88 and gravity lowers the conveyor and dead plate to their initial solid line position. While the dead plate is in the raised position, a depending flange 49 thereof backs up the three bars P already on the plate 50. When the dead plate 44 is again lowered to the full line position, vacuum is applied to the connection 70 for the stop unit 54—68 which moves the stops 54 and 56 away from the six bars P now on 50 and 52, to the dotted position shown.

The in-feed section 32 also includes a "clamp unit" comprising elements 94 to 106, inclusive. The element 94 is a bracket which extends upwardly from the plate 90 and carries a diaphragm chamber 96 in which there is a diaphragm 98. A stem 100 extends from the diaphragm 98 and terminates at its lower end in a padded clamp foot 102, a spring 104 being provided for normally biasing the foot 102 downwardly to engage a bar P thereunder, whereas a vacuum connection 106 is provided to lift the foot 102 at desirable times in the operating cycle of the cartoner.

Referring to Fig. 16 wherein the bars P are deposited on the plates 50 and 52, means is provided for shifting the collected bars from station (2) to station (3) comprising a collector pusher consisting of a lower plate 108 and an upper plate 110 (see also Fig. 21) carried on a bracket 112 which in turn is mounted on a collector pusher slide consisting of rods 114 and a cross bar 116. The rods 114 are slidable in bearings 118, and the cross bar 116 is connected by a link 120 to the upper end of a cam lever 122, pivoted at 123 and carrying a cam roller 124. The roller 124 coacts with a cam groove 128 in the face of a cam 126 mounted on a cam shaft 130 journalled in bearings 131 (see Fig. 9).

As next shown in Fig. 17, the bars P are pushed by the plates 108 and 110 from the plates 50 and 52 and to station (3) where they enter a collector elevator 132 of channel shape (see also Fig. 22). This elevator is mounted on vertical rods 134 slidable in bearings 136 of brackets 135 which are stationarily mounted on the frame F. The brackets carry an angle-shaped product stop 137. The bars P are then elevated to station (4), as shown in Fig. 18, by means of a link 138 depending from the lower ends of the rods 134, and connected at its lower end (see Fig. 16) to a bell crank 140 pivoted at 142 and carrying a roller 144, which roller is engaged in a cam groove 146 of a cam 148 also on the cam shaft 130 (also see Fig. 9).

The bars P are now ready to be cartoned, but first I will next describe the carton feeding and gluing mechanism.

Referring to Figs. 8, 10, 11 and 12, the carton feeder and glue-applying section 34 includes a chute comprising vertical guides 150 for holding the cartons C in the flat, the guides being provided at their lower ends with carton holding tips 152 to support the stack of cartons but permit the lowermost one to be extracted from the bottom of the stack by vacuum cups 154, as disclosed in the Taggart Patent No. 2,877,737. The vacuum cups 154 are supported on a supporting plate 156 to the bottom of which a bracket 158 is secured. The bracket 158 is supported by a rock arm 160 and a link 162, the rock arm having a roller 164 thereon contacting a cam 166, whereby the vacuum cups are vertically reciprocated once each cycle of operation of the cartoner.

Two supporting rods 168 are adapted to support the carton when the vacuum cups 154 lower below the tops of the rods, and these rods are slidable at their right-hand ends (Fig. 11) in a slide guide 170. The rods 168 are provided with carton engaging flanges 169 adjacent the guide 170. At their forward ends, the rods 168 are supported by a rock arm 172 carrying a roller 174 for contact with a cam 176. Springs 178 and 180 are associated with the link 162 and an extension 163 from the lower end of the rock arm 172 to normally retain the rollers 164 and 174 in contact with their respective cams 166 and 176.

The cams 166 and 176 are mounted on a cam shaft 182 which, as shown in Fig. 10, has a gear 184 thereon driven from a pinion 186 on a shaft 188. The shaft 188 has a sprocket 190 thereon driven by a chain 192 (see Fig. 9) from a sprocket 194 on the cam shaft 130. The cam shaft 130 is the main shaft of the cartoner and is driven by a chain 196 (see also Fig. 8) from a variable gear reducer 198 (adjusted by hand wheel 203—Fig. 2) and an electric motor 200. A normally de-clutched handwheel 202 is mounted on the cam shaft 130 for rotating it by hand during adjustments of the cartoner preliminary to a cartoning run.

Returning to Fig. 11, a carton C is shown extending partially around a pair of discs 204 (see also Fig. 10 where the discs but not the carton are shown) and then depends tangently from the left side of the discs. A pair of conforming brackets 206 and rollers 208 guide the carton so that it depends vertically from the carton feeder and glue-applying section 34. As the carton passes around the discs 204, three flaps thereof have glue applied thereto as shown shaded in Fig. 4 between stations (4) and (5), by an axially extending glue strip 210 that contacts the upper flap and a pair of glue segments 212 that contact the side flaps. The elements 210 and 212 are carried by a pair of disc segments 214 on a shaft 216, and the strip 210 and segments 212 have glue applied thereto from a glue metering roll 218 by intermittent contact therewith. The glue metering roll 218 in turn receives glue by contact from a glue pickup roll 220 rotating in a glue pot 222.

As shown in Fig. 12, a bar 224 supports one end of the shaft of the roller 218 and one end of a shaft 221 of the roller 220, the bar having a slot 226 for the shaft 221 so as to adjust the roller 218 toward and away from the roller 220. At the other ends of the shafts, a similar bar 224 is provided. The shaft 221 is journalled at its ends in the glue pot end walls of the glue pot 222 as shown in Fig. 8. The two bars 224 also have eccentric receiving slots 228 for eccentrics 230 of eccentric adjusting screws 232 which are threaded in the glue pot end walls and their adjustments retained by lock nuts 234. Pressure adjusting screws 236 are provided for swinging the arms 224 and thereby positioning the glue metering roll 218 with respect to the glue strip 210 and the glue segments 212 for proper transfer of glue from the roll to the strip and segments.

The carton C depending from the section 34 in Fig. 11 moves downwardly during further operation of the cartoner until it is released from the discs 204 and the glue strip 210, whereupon it drops by gravity down to the position shown in Fig. 10 with its lower end on stop wires 238, this being the position shown between stations (4) and (5) in Fig. 4, and also in Figs. 17 and 18.

Referring to Figs. 16 to 19 and 23, a channel-shaped pre-break horn 240 is shown supported on slide blocks 242 which slide on slide rods 244. The rods 244 are stationarily supported by brackets 246 secured to the frame F of the cartoner, and a V-frame 248 connects the slide blocks 242 together so that they may be slid along the rods 244 by a link 250. The link 250 is connected to the upper end of a bell crank 252 as shown in Fig. 16, the other arm of which is provided with a roller 254 in a cam grove 256 of the same cam 148 in which the cam groove 146 is located. The bell crank is pivoted on a stub shaft 253.

Stationary top and bottom carton breakers 258 and 260 are provided. Fig. 19 shows the product (bars P) and the carton C being moved toward the right through the space between the breakers 258 and 260 by a cartoning pusher 262 which, as shown in Fig. 24, is carried by a main slide comprising slide rods 264, a cross bar 266 and a cross plate 268. The slide rods 264 slide in bearings 270 secured to the frame F, and reciprocation is imparted to the assembly by a link 272 pivotally connected to the upper end of a lever 274 which is pivoted at 275 on the frame F, as shown in Fig. 8, and operated by a connecting rod 276 from a crank 278 on the cam shaft 130.

As the bars and cartons are moved from station (4) to the position shown in Fig. 19, the sides and bottom of the pre-break horn enter the breakers 258 and 260 and front panel tab tuckers 280 in the form of stationary plates to pre-break the carton C. The tuckers 280 coact with tabs 281 (Fig. 4) of the carton, and later stationary bottom panel flap tuckers 282 coact with flaps 283 (Fig. 4). Finally, rear tab tuckers 284 coact with tabs 285 of the carton as at (5A) in Fig. 4, and these are shown in detail in Fig. 26. The tuckers 284 are in the form of plates supported on slide blocks 286 which slide on guide rods 288 supported in stationary brackers 290 secured to the frame F. The slide blocks 286 are normally held in the positions illustrated in Fig. 26 by springs 287, and at times are retracted from these positions by rock arms 292 mounted on vertical shafts 294 journalled in the slide blocks 286, the outer ends of the rock arms engaging notches 293 of the slide blocks.

Rock arms 296 are secured on the lower ends of the shafts and carry cam roller 298 to coact with cams 300. The cams 300, as shown also in Fig. 21, are mounted on the rods 114.

A pair of pusher dogs 302, and a second pair 304, are pivoted on the cross plate 268 as shown in Figs. 8, 16, 18, 20 and 24, and each one is constrained to an elevated position by a spring 306. The dogs 302 are for advancing the partially cartoned product from station (5) to station (6), and the dogs 304 from station (6) to station (7) respectively.

For elevating the carton C from station (7) into a stationary carton compression chamber 308 of rectangular tubular form, and for elevating the completed cartons C' therethrough, an elevator 310 (see Figs. 20, 28 and 29) is provided mounted on the top of a vertically slidable post 312. The post 312 is formed in two parts, as shown in Fig. 28, and is provided with a pair of vertical slide rods 313, slidable in bearings 315 of a bracket 317 secured to the frame F. A link 314 has its upper end pivoted to the post 312 and its lower end terminates in an eccentric strap 316 surrounding an eccentric 318 on shaft 320. The shaft 320 is rotated by a chain 322 (Fig. 8) extending to a sprocket on the cam shaft 130. As shown in Fig. 20, a pair of spring biased, pivoted holding dogs 324 is provided to support the stack of cartons in the chamber 308 as the lowermost carton is moved therepast by the elevator 310 from station (7) to station (8). The topmost carton, each cycle of operation of the cartoner, is pushed off the stack by a pusher lever 326 secured to the upper end of a vertical rock shaft 328. The lower end of the rock shaft carries a lever 330 operatively connected by a link 332 to a plate 334 secured to the assembly of slide blocks 242 and V-frame 248 illustrated in Fig. 23. The cartons C' are discharged onto a discharge chute 327.

A stationary supporting rail 303 extends from the bottom carton breaker 260 to the far end of the chamber 308 as shown in Fig. 8, passing between the pair of dogs 302 and 304 as shown dotted in Fig. 24, between the two-part elevator 310 as shown dotted in Fig. 28, and between two parts of the bracket 317. The bracket 317 has a pad 319 to which the end of the supporting rail 303 is secured.

In Fig. 8, I show a vacuum pump 335 to evacuate the vacuum cups 154 and operate the stop unit, lift unit and clamp unit diaphragms 66, 82 and 98 respectively. In Fig. 10, a vacuum valve 336 is mounted on the frame F and actuated once each cycle of operation of the cartoner by a cam 338 on the cam shaft 182. In Fig. 8, three cams 340 on the shaft 320 actuate three switches shown generally at 342, which switches in turn may actuate vacuum valves (not shown) or the cams may actuate such vacuum valves directly for controlling the connection of the stop, lift and clamp units to the intake of the vacuum pump 335 for actuating the diaphragms 66, 82 and 98 in accordance with the cycling of the cartoner.

The various elements of my cartoner which transport product through the cartoner and coact with the carton to enclose the product therein are adjustable as to height, width and length so that the cartoner can package various quantities of different size product in cartons ranging all the way from ½" to 2½" in height, 5½" to 11" in width and 2½" to 5" in length. At station (8) the size of the carton compression chamber 308 is also adjustable (see Fig. 7). I have not attempted to go into detail with respect to the means for these adjustments as I do not consider adjustment per se as being my invention. Also, the machine can be adjusted for one layer of product by omitting operation of the lift unit 72—86.

Practical operation

In the operation of my cartoner, after the various elements of the machine have been adjusted for the product and carton sizes to be handled, the product P is delivered in any suitable manner to the in-feed conveyor 48, which delivers them onto the dead plate 44 at station (1). In the example illustrated, three bars are delivered from the dead plate onto the bottom plate 50 of the collector plate assembly and the dead plate then shifts upwardly by operation of the diaphragm 82 to deliver three more bars onto the top plate 52 thereof. The plates 50 and 52 are at station (2). The vacuum is released from the diaphragm 98 of the clamp unit 94—106 to clamp the last bar B on the rails 46 of the dead plate 44 so that the pressure of additional bars from the conveyor 48 cannot push the bars on the dead plate against those on the plate 50, and at the same time the stop unit 54—68 is actuated to the dotted position to release the pressure on the three bars P on the plate 50 while the dead plate 44 is being elevated to its dotted position in Fig. 13. The clamp foot 102 is then released so that three bars can be pushed onto the plate 52, the stop unit stops 54 and 56 being returned to the full line position at this time, and then the clamp foot 102 comes into action again while the dead plate is being lowered to the initial position.

The six bars P on the plates 50 and 52 as shown in Fig. 16 at station (2) are pushed forwardly to station (3) onto the collector elevator 132 as shown in Fig. 17 by the collector pusher 108—110. They are then elevated by the collector elevator 132 from station (3) to station (4) as shown in Fig. 18 while the cartoning pusher 262 is in the retracted position with respect to Fig. 17.

Next, the cartoning pusher 262 is moved toward the right, as in Fig. 19, to push the product P from station (4), first between the top carton breaker 258 and the bottom carton breaker 260 to fold the top panel of the carton down against the top of the product and the bottom panel thereof up against the bottom of the product, and then past the front panel tab tuckers 280 which fold the tabs 281 of Fig. 4 against the product, then past the bottom panel flap tuckers 282 in the form of sheet metal plows which fold the bottom panel flaps 283 of Fig. 4 upwardly, all of which is completed by the time that the product and carton reach station (5), as shown at the right-hand end of Fig. 17. At station (5) the rear tab tucker plates 284 then move toward each other to fold the rear tabs 285 against the rear of the product as shown in (5A) of Fig. 4, following which the pusher dogs 302 move rearwardly and contact the rear bottom panel flap 287 of Figs. 4 and 17 and as they clear the body of the carton their springs pivot them upwardly to bend the flap 287 to upright position as in Fig. 18, whereupon further movement of the pusher dogs 302 move the partially cartoned product from station (5) to station (6).

Station (6) is an idle station and accordingly the carton has not been illustrated in detail at this station in Fig. 4, but the condition of the carton would be the same as at station (7). Next, the pusher dogs 304 engage the carton at station (6) and move it to station (7) over the elevator 310, which thereupon elevates the carton from station (7) to station (8) and at the same time effects completion of the cartoning by bending the top panel rear flap 289 downwardly as well as both top panel side flaps 291. All three flaps 289, 291 and 291 are the ones to which glue has been applied so that elevation of the carton C from station (7) to station (8) effects gluing and sealing of the carton and the completion thereof as the carton is elevated through the compression chamber 308. The travel of the completed cartons C' through this chamber for a dozen cycles or so of the cartoning machine insures the required time for the glue to set and the holding dogs 324 permit passage of the cartons but prevent their return so that the elevator 310 can be lowered for another elevating cycle.

The various cams of the machine operate the mechanical mechanism thereof in timed relation in an obvious manner, and the cams 340 and switches 342, as well as the vacuum switch 336 and the cam 338 that operates it, are likewise timed so that vacuum is established to the stop unit, lift unit and clamp unit of Fig. 13, and to the vacuum cups 154 of Fig. 11 at the proper times in an obvious and more or less conventional manner. Accordingly, detailed illustration and description thereof are believed not required.

From the foregoing specification it will be obvious that I have provided a cartoning machine which will accomplish the objects of my invention and may be adjusted for cartons of different size and product of different number inserted into the cartons, all operations being entirely automatic, requiring only the feeding of product to the conveyor 48 and the removal of product discharged down the chute 327.

Some changes may be made in the construction and arrangement of the parts of my cartoning machine without departing from the real spirit and purpose of my invention, and it is my intention to cover by my claims any modified forms of structure or use of mechanical equivalents which may reasonably be included within their scope.

I claim as my invention:

1. In a cartoning machine of the character disclosed, an in-feed conveyor, a dead plate onto which said conveyor delivers articles of product to be cartoned, a collector plate adapted to receive a number of articles from said dead plate, a collected product pusher adapted to coact with the articles on said collector plate and push them therefrom, a collected product elevator onto which said collected product pushes the articles, a product stop ahead of said elevator in the lower position thereof, a pre-break horn ahead of said elevator in the upper position thereof, means for delivering a carton blank having certain flaps thereof glued to a position in front of said collected product elevator, a cartoning pusher for pushing the product from said collected product elevator in the elevated position thereof into said pre-break horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, tab tuckers at said station movable inwardly toward each other for tucking further tabs of the carton behind the product, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means for removing the topmost carton from the stack of cartons being elevated through said compression chamber each cycle of operation of the cartoner and discharging it therefrom.

2. A cartoning machine of the character disclosed comprising an in-feed conveyor, a collector plate adapted to receive a number of articles from said conveyor, a collected product pusher adapted to coact with the articles on said collector plate and push them therefrom, a collected product elevator onto which said collected product pusher pushes the articles, means for delivering a carton blank to a position in front of said collected product elevator, carton breakers ahead of said elevator in the upper position thereof, a cartoning pusher for pushing the product from said collected product elevator between said carton breakers, tab and flap tuckers ahead of said carton breakers for tucking tabs and flaps of the carton as said cartoning pusher pushes the product and carton past them to a predetermined station in the cartoner, tab tuckers at said station movable inwardly toward each other for tucking further tabs of the carton behind the product, reciprocably mounted pusher dogs for moving the carton to a further station in the cartoner, an elevator at said last station for elevating the partially cartoned product, and a vertically elongated carton compression chamber into which said elevator pushes the partially cartoned product, the sides of said chamber tucking the remaining flaps of said carton and holding them in tucked position.

3. In a cartoning machine, an in-feed conveyor, a dead plate onto which said conveyor delivers articles of product to be cartoned, a collector plate adapted to receive a number of articles from said dead plate, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a cartoning pusher for pushing the product from said collected product elevator in the elevated position thereof, carton breakers between which said cartoning pusher pushes the carton and the product, tab and flap tuckers ahead of said carton breakers for tucking tabs and flaps of the carton as said cartoning pusher pushes the product and carton past them, tab tuckers movable inwardly toward each other for tucking further tabs of the carton behind the product, reciprocably mounted pusher dogs for engaging another flap of the carton and tucking it, said dogs also moving the carton to a further station in the cartoner, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets.

4. In a cartoning machine, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a pre-break horn ahead of said collected product elevator in the elevated position thereof, a cartoning pusher for pushing the product from said collected product elevator in the elevated position thereof into said pre-break horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the product and carton to a further station, an elevator for then elevating the partially cartoned product, a vertically elongated carton compression chamber into which said elevator pushes the partially cartoned product, the sides of said chamber tucking the remaining flaps of said carton which are glued and holding them in tucked position while the glue thereon sets.

5. In a cartoning machine, an in-feed conveyor, a plurality of collector plates vertically spaced from each other, a lift unit for said in-feed conveyor for moving it to successive positions for delivering successively a plurality of articles to each of said collector plates, a collected product pusher adapted to coact with the articles on said collector plates and push them therefrom, a collected product elevator onto which said collected product pusher pushes the articles, means for delivering a carton blank to a position in front of said collected product elevator, a product stop ahead of said elevator in the lower position thereof, a cartoning pusher for pushing the product from said collected product elevator in the elevated position thereof, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, pusher dogs engaging another flap of the carton and tucking it, said dogs also moving the carton to a further station in the cartoner, an elevator at said last station for elevating the partially cartoned product, and a vertically elongated carton compression chamber into which said elevator pushes the partially cartoned product, the sides of said chamber tucking the remaining flaps of said carton.

6. A cartoning machine comprising an in-feed conveyor, a dead plate onto which said conveyor delivers articles of product to be cartoned, a plurality of collector plates vertically spaced from each other, a lift unit for said dead plate for moving it to successive positions for delivering a plurality of articles to each of said collector plates, a collected product pusher adapted to coact with the articles on said collector plates and push them therefrom, a collected product elevator onto which said collected product pusher pushes the articles, a product stop ahead of said elevator in the lower position thereof, means for delivering a carton blank with certain flaps thereof glued to a position in front of said collected product elevator, a pre-break horn ahead of said collected product elevator in the elevated position thereof, a cartoning pusher for pushing the product from said collected product elevator into said pre-break horn, carton breakers between which said cartoning pusher pushes the carton and the product, said pre-break horn moving with the product to pre-break the carton, tab and flap tuckers ahead of said carton breakers for tucking certain tabs and flaps of the carton as said cartoning pusher pushes the product and carton past them to a predetermined station in the cartoner, reciprocably mounted pusher dogs biased upwardly and depressible by engagement with the carton as the dogs reciprocate in a rearward direction, said dogs upon reciprocating in the forward direction engaging another flap of the carton and tucking it, said dogs also moving the carton to a further station in the cartoner, an elevator at said last station for elevating the partially cartoned product, a carton compression chamber into which said elevator pushes the partially cartoned product, the sides of said chamber tucking the remaining flaps of said carton which are glued and holding them in tucked position during passage thereof through said compression chamber, and means for removing the topmost carton from the stack of cartons being elevated in said compression chamber and discharging it from the cartoner.

7. A cartoning machine comprising an in-feed conveyor, a dead plate onto which said conveyor delivers articles of product to be cartoned, a collector plate adapted to receive a number of articles from said dead plate, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a pre-break horn ahead of said collected product elevator in the elevated position thereof, a cartoning pusher for pushing the product from said collected product elevator in the elevated position thereof into said prebreak horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means operable each cycle of operation of said cartoner for removing the topmost carton from the stack of cartons being elevated in said compression chamber and discharging it from the cartoner.

8. In a cartoning machine of the character disclosed, an in-feed conveyor, a collector plate adapted to receive a number of articles from said in-feed conveyor, a clamp unit for at least one of the articles to prevent further movement of the articles, a collected product pusher adapted to coact with the articles on said collector plate and push them therefrom, a collected product elevator onto which said collected product pusher pushes the articles, means for delivering a carton blank to a position in front of said collected product elevator, a cartoning pusher for pushing the product from said collected product elevator in the elevated position thereof, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, pusher dogs for engagement with the carton to move it to a further station in the cartoner, an elevator at said last station for elevating the partially cartoned product, a vertically elongated carton compression chamber into which said elevator pushes the partially cartoned product, the sides of said chamber tucking the remaining flaps of said carton and holding them in tucked position while they pass through said chamber, and means for removing the topmost carton from the stack of cartons in said chamber.

9. In a cartoning machine, an in-feed conveyor, a dead plate onto which said conveyor delivers articles of product to be cartoned, a collector plate adapted to receive a number of articles from said dead plate, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plate and push them therefrom, a collected product elevator onto which said collected product pusher pushes the articles, means for delivering a carton blank to a position in front of said collected product elevator, a pre-break horn ahead of said collected product elevator in the elevated position thereof, a cartoning pusher for pushing the product from said collected product elevator in the elevated position thereof into said pre-break horn, carton breakers between which said cartoning pusher pushes the carton and the product, said pre-break horn moving with the product to pre-break the carton, tab and flap tuckers ahead of said carton breakers for tucking certain tabs and flaps of the carton as said cartoning pusher pushes the product and carton past them, and means for tucking the remaining tabs and flaps of said carton and discharging the cartons from the cartoner.

10. In a cartoning machine of the character disclosed, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a cartoning pusher for pushing the product from said collected product elevator in the elevated position thereof, carton breakers between which said cartoning pusher pushes the carton and the product, tab and flap tuckers ahead of said carton breakers for tucking tabs and flaps of the carton as said cartoning pusher pushes the product and carton past them, and means for tucking the remaining tabs and flaps of said carton and discharging the cartons from the cartoner.

11. A cartoning machine of the character disclosed comprising an in-feed conveyor, a dead plate onto which said conveyor delivers articles of product to be cartoned, a plurality of collector plates vertically spaced from each other, a lift unit for said dead plate for moving it to successive positions for delivering a plurality of articles to each of said collector plates, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a pre-break horn ahead of said elevator in the elevated position thereof, a cartoning pusher for pushing the product from said collected product elevator in the elevated position thereof into said pre-break horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, tab tuckers at said station movable inwardly toward each other for tucking further tabs of the carton behind the product, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, an elevator at said last station for elevating the partially cartoned product, and a vertically elongated carton compression chamber into which said elevator pushes the partially cartoned product, the sides of said chamber tucking the remaining flaps of said carton which are glued and holding them in tucked position while the glue sets.

12. In a cartoning machine of the character disclosed, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, a clamp unit for at least one of the articles on said dead plate to prevent further movement of the articles thereon, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a pre-break horn ahead of said elevator in the upper position thereof, a cartoning pusher for pushing the product from said collected product elevator in the elevated position thereof into said prebreak horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, tab tuckers at said station movable inwardly toward each other for tucking further tabs of the carton behind the product, reciprocably mounted pusher dogs for moving the carton to a further station in the cartoner, an elevator at said last station for elevating the partially cartoned product, and a carton compression chamber into which said elevator pushes the partially cartoned product, the sides of said chamber tucking the remaining flaps of said carton.

13. In a cartoning machine of the character disclosed, an in-feed conveyor, a dead plate onto which said conveyor delivers articles of product to be cartoned, a plurality of collector plates vertically spaced from each other, a lift unit for said dead plate for moving it to successive positions for delivering a plurality of articles to each of said collector plates, a stop unit for the articles on each of said collector plates, said stop unit having stops for the product and being operable to move said stops away from the product to release it for being pushed off said collector plates, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a cartoning pusher for pushing the product from said collected product elevator carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in a rearward direction, said dogs upon reciprocating in the forward direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means for removing the topmost carton from the stack of cartons being elevated through said compression chamber and discharging it from the cartoner.

14. A cartoning machine of the character disclosed comprising an in-feed conveyor, a stop unit for the articles on said collector plate, said stop unit having a stop for the product and being operable to move said stop away from the product to release it for being pushed off said collector plates, a collected product pusher adapted to coact with the articles on said collector plate and push them therefrom, a collected product elevator onto which said collected product pusher pushes the articles, means for delivering a carton blank to a position in front of said collected product elevator, a cartoning pusher for pushing the product from said collected product elevator, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, an elevator at said last station for elevating the partially cartoned product, means for tucking the remaining flaps of said carton, and means for removing the completed cartons from the cartoner.

15. In a cartoning machine, an in-feed conveyor, a dead plate onto which said conveyor delivers articles of product to be cartoned, a plurality of collector plates vertically spaced from each other, a lift unit for said dead plate for moving it to successive positions for delivering a plurality of articles to each of said collector plates, a stop unit for the articles on each of said collector plates, said stop unit having stops for the product and being operable to move said stops away from the product to release it for being pushed off said collector plates, a collected product pusher adapted to coact with the articles on said collector plates and push them therefrom, means for delivering a carton blank with certain flaps thereof glued to a position in front of the collected product, a cartoning pusher, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, and an elevator at said last station for elevating the partially cartoned product, tucking the remaining flaps of said carton which are glued and holding them in tucked position while the glue sets.

16. In a cartoning machine, an in-feed conveyor, a dead plate onto which said conveyor delivers articles of product to be cartoned, a collector plate adapted to receive a number of articles from said dead plate, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a cartoning pusher for pushing the product from said collected product elevator, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means for removing the topmost carton from the stack of cartons being elevated in said compression chamber and discharging it from the cartoner.

17. In a cartoning machine of the character disclosed, an in-feed conveyor, a collector plate adapted to receive a number of articles from said conveyor, a collected product pusher adapted to coact with the articles on said collector plate and push them therefrom, a collected product elevator onto which said collected product pusher pushes the articles, means for delivering a carton blank to a position in front of said collected product elevator, a pre-break horn ahead of said elevator in the upper position thereof, a cartoning pusher for pushing the product from said collected product elevator into said pre-break horn, carton breakers between which said cartoning pusher pushes the carton and the product, said pre-break horn moving with the product to pre-break the carton, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, an elevator at said last station for elevating the partially cartoned product, and a vertically elongated carton compression chamber into which said elevator pushes the partially cartoned product, the sides of said chamber tucking the remaining flaps of said carton.

18. In a cartoning machine of the character disclosed, a collector plate adapted to receive a number of articles to be cartoned, means for delivering product thereto, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a cartoning pusher for pushing the product from said collected product elevator, carton breakers between which said cartoning pusher pushes the carton and the product, tab and flap tuckers ahead of said carton breakers for tucking tabs and flaps of the carton as said cartoning pusher pushes the product and carton past them to a predetermined station in the cartoner, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a further station in the cartoner, and means for completing the cartoning of the product at said further station.

19. In a cartoning machine, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a cartoning pusher for pushing the product from said collected product elevator, carton breakers between which said cartoning pusher pushes the carton and the product, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means for removing the topmost carton from the stack of cartons being elevated in said compression chamber and discharging it from the cartoner.

20. A cartoning machine of the character disclosed comprising a collector plate, means for delivering a plurality of articles to said collector plate, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a pre-break horn ahead of said elevator in the upper position, a cartoning pusher for pushing the product from said collected product elevator in the elevated position thereof into said prebreak horn, carton breakers between which said cartoning pusher pushes the carton and the product, said pre-break horn moving with the product to pre-break the carton, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, further pusher dogs engageable with the carton at said last mentioned station for pushing the partially cartoned product to a station in the cartoner from which the carton and product are to be elevated, and an elevator at said last station for elevating the partially cartoned product and tucking the remaining flaps of said carton which are glued and holding them in tucked position while the glue sets.

21. A cartoning machine comprising an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, said in-feed conveyor delivering articles to said dead plate at a rate in excess of the requirements of the cartoning machine and slipping under the articles when the capacity of the dead plate is reached, a clamp unit for at least one of the articles on said dead plate to prevent further movement of the articles thereon, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a cartoning pusher, carton breakers between which said cartoning pusher pushes the carton and the product, pusher dogs for moving the carton to a further station in the cartoner, an elevator at said last station for elevating the partially cartoned product, and a vertically elongated carton compression chamber into which said elevator pushes the partially cartoned product.

22. In a cartoning machine of the character disclosed, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a cartoning pusher, carton breakers between which said cartoning pusher pushes the carton and the product, reciprocably mounted pusher dogs biased upwardly and depressible by engagement with the carton as the dogs reciprocate in one direction, said dogs upon reciprocating in the opposite direction engaging another flap of the carton and tucking it, said dogs also moving the carton to a further station in the cartoner, an elevator at said last station for elevating the partially cartoned product, and a vertically elongated carton compression chamber into which said elevator pushes the partially cartoned product and tucks the remaining glued flaps of said carton.

23. A cartoning machine of the character disclosed comprising an in-feed conveyor, a collector plate, said conveyor delivering a plurality of articles to said collector plate, a collected product pusher adapted to coact with the articles on said collector plate and push them therefrom, a collected product elevator onto which said collected product pusher pushes the articles, means for delivering a carton blank with certain flaps thereof glued to a position in front of said collected product elevator, a cartoning pusher for pushing the product from said collected product elevator in the elevated position thereof, carton breakers between which said cartoning pusher pushes the carton and the product, two sets of pusher dogs for moving the carton successively to two stations in the cartoner, an elevator at the second station for elevating the partially cartoned product, and a vertically elongated carton compression chamber into which said elevator pushes the partially cartoned product, the sides of said chamber folding the remaining flaps of said carton which are glued and holding them in tucked position while the glue sets.

24. In a cartoning machine, an in-feed conveyor, a dead plate onto which said conveyor delivers articles of product to be cartoned, a plurality of collector plates vertically spaced from each other, a lift unit for said dead plate for moving it to successive positions for delivering successively a plurality of articles to each of said collector plates, a collected product pusher adapted to coact with the articles on said collector plates and push them therefrom, a collected product elevator onto which said collected product pusher pushes the articles, means for delivering a carton blank with certain flaps thereof glued to a position in front of said collected product elevator, a product stop and a pre-break horn ahead of said elevator in the lower and upper positions thereof respectively, a cartoning pusher for pushing the product from said collected product elevator thereof into said pre-break horn, carton breakers between which said cartoning pusher pushes the carton and the product, said pre-break horn moving with the product to pre-break the carton, pusher dogs, means for tucking another flap of the carton and moving the carton to a further station in the cartoner, an elevator at said last station for elevating the partially cartoned product, a vertically elongated carton compression chamber into which said elevator pushes the partially cartoned product, the sides of said chamber tucking the remaining flaps of said carton which are glued and holding them in tucked position while the glue sets, and means operable each cartoner cycle for removing the topmost carton from the stack of cartons being elevated through said compression chamber.

No references cited.